United States Patent
Cox et al.

(10) Patent No.: US 6,817,373 B2
(45) Date of Patent: Nov. 16, 2004

(54) ONE-DIRECTIONAL MICROBALL VALVE FOR A MICROFLUIDIC DEVICE

(75) Inventors: David M. Cox, Foster City, CA (US); Michael P. Harrold, San Mateo, CA (US); Dennis Mead, Campbell, CA (US)

(73) Assignee: Applera Corporation, Foster City, CA (US)

(*) Notice: Subject to any disclaimer, the term of this patent is extended or adjusted under 35 U.S.C. 154(b) by 0 days.

(21) Appl. No.: 10/426,587

(22) Filed: Apr. 30, 2003

(65) Prior Publication Data

US 2004/0016898 A1 Jan. 29, 2004

Related U.S. Application Data

(60) Provisional application No. 60/398,777, filed on Jul. 26, 2002, provisional application No. 60/398,778, filed on Jul. 26, 2002, provisional application No. 60/398,852, filed on Jul. 26, 2002, and provisional application No. 60/398,946, filed on Jul. 26, 2002.

(51) Int. Cl.[7] .......................... F16K 31/12; F16K 49/00
(52) U.S. Cl. .......................... 137/1; 137/829; 137/533; 137/533.11; 137/341; 251/11
(58) Field of Search ............................ 137/829, 825, 137/511, 843, 528, 533.11, 533, 1, 334, 341; 251/11

(56) References Cited

U.S. PATENT DOCUMENTS

| | | | |
|---|---|---|---|
| 4,601,305 A | | 7/1986 | Nordskog .................. 137/528 |
| 4,911,616 A | * | 3/1990 | Laumann, Jr. ........... 417/413.3 |
| 6,102,897 A | | 8/2000 | Lang ......................... 604/246 |
| 6,129,331 A | * | 10/2000 | Henning et al. ............ 137/341 |
| 6,160,243 A | * | 12/2000 | Cozad ........................ 251/11 |
| 6,338,361 B2 | | 1/2002 | Kao et al. .................. 137/512 |
| 6,382,254 B1 | * | 5/2002 | Yang et al. ................ 137/341 |
| 6,595,950 B1 | * | 7/2003 | Miles et al. ................ 604/80 |
| 2003/0152463 A1 | * | 8/2003 | Shuler et al. ............. 417/53 |

* cited by examiner

*Primary Examiner*—Kevin Lee
(74) *Attorney, Agent, or Firm*—Kilyk & Bowersox, P.L.L.C.

(57) ABSTRACT

A microfluidic device that includes a micro ball valve is provided. The microball valve is capable of preventing or interrupting fluid flow through the microfluidic device. The microfluidic device can include a substrate layer, and a microfluidic pathway that includes the microball valve. Methods are provided for manipulating fluids using the microfluidic device.

4 Claims, 5 Drawing Sheets

ONE-DIRECTIONAL MICROBALL VALVE FOR A MICROFLUIDIC DEVICE

CROSS REFERENCE TO RELATED APPLICATION

The present application claims benefits under 35 U.S.C. §119 and/or §120 from earlier filed U.S. Provisional Patent Applications Nos. 60/398,777, 60/398,778, 60/398,852, and 60/398,946, all filed Jul. 26, 2002. All U.S. patent applications mentioned herein are incorporated herein in their entireties by reference.

FIELD

The present teachings relate to microfluidic devices, and methods for using such devices. More particularly, the present teachings relate to devices and methods that allow for the manipulation and processing of micro-sized amounts of fluids in a microfluidic device.

BACKGROUND

Microfluidic devices are useful for manipulating micro-sized fluid samples. There continues to exist a need for devices and methods for achieving quick, simple, reliable, and cost effective fluid manipulation control in microfluidic devices to efficiently process micro-sized fluid samples therein.

SUMMARY

According to various embodiments, a microfluidic device is provided including a one-directional microball valve. The one-directional microball valve can be situated within a passageway of the microfluidic device and can control fluid flow between microfluidic features formed in or on the microfluidic device.

According to various embodiments, the microball valve can include at least one ball element that includes an outer-peripheral feature that mates with an inner-peripheral feature of a corresponding valve seat. The valve seat can be situated between an entrance opening and an exit opening of a passageway and can be defined by a portion of the passageway. Alternatively, a microball valve and seat assembly can be disposed in a through hole formed in a substrate.

According to various embodiments, the microfluidic device can include a substrate that includes a pathway formed therein. The pathway can include a passageway with an entrance opening and an exit opening separated by a one-dimensional microball valve. The passageway can be positioned between and in fluid communication with two adjacent but separated microfluidic features of the microfluidic device. The through passageway can taper outwardly between the entrance opening and the exit opening. The entrance opening can have a first minimum dimension and the exit opening can have a second minimum dimension that is greater than the first minimum dimension. The minimum dimensions can be diameters.

According to various embodiments during operation, the ball valve element can be unseated from the valve seat by the force of fluid flowing in a direction from the entrance opening of the passageway to the exit opening. The ball valve element can be forcibly seated against the valve seat by way of backpressure or reverse fluid flow caused by fluid disposed downstream of the ball element and flowing in a direction from the entrance opening toward the exit opening.

According to various embodiments, a method is provided for interrupting fluid communication through a microfluidic device by utilizing a one-directional microball valve. The method can include manipulating a fluid to unseat the microball and flow in a direction from the entrance opening toward the exit opening. The microball element can then be caused to seat against the valve seat to at least partially prevent or interrupt fluid flow in a direction from the exit opening toward the entrance opening. The method can include multiple seating and/or unseating operations of the microball with respect to the valve seat.

BRIEF DESCRIPTION OF THE DRAWINGS

The present teachings may be more fully understood with reference to the accompanying drawing figures and the descriptions thereof. Modifications that would be recognized by those skilled in the art are considered a part of the present teachings and within the scope of the appended claims.

DESCRIPTION OF VARIOUS EMBODIMENTS

According to various embodiments, a microfluidic device is provided including a one-directional microball valve. The one-directional microball valve can be situated within a passageway of the microfluidic device and can control fluid flow between microfluidic features formed in or on the microfluidic device. The microball valve can be used to manipulate fluid movement in and through the microfluidic device. Methods for manipulating fluids, that can be practiced in the microball valve microfluidic devices described herein, are exemplified with reference to FIG. 1.

Figure 1:
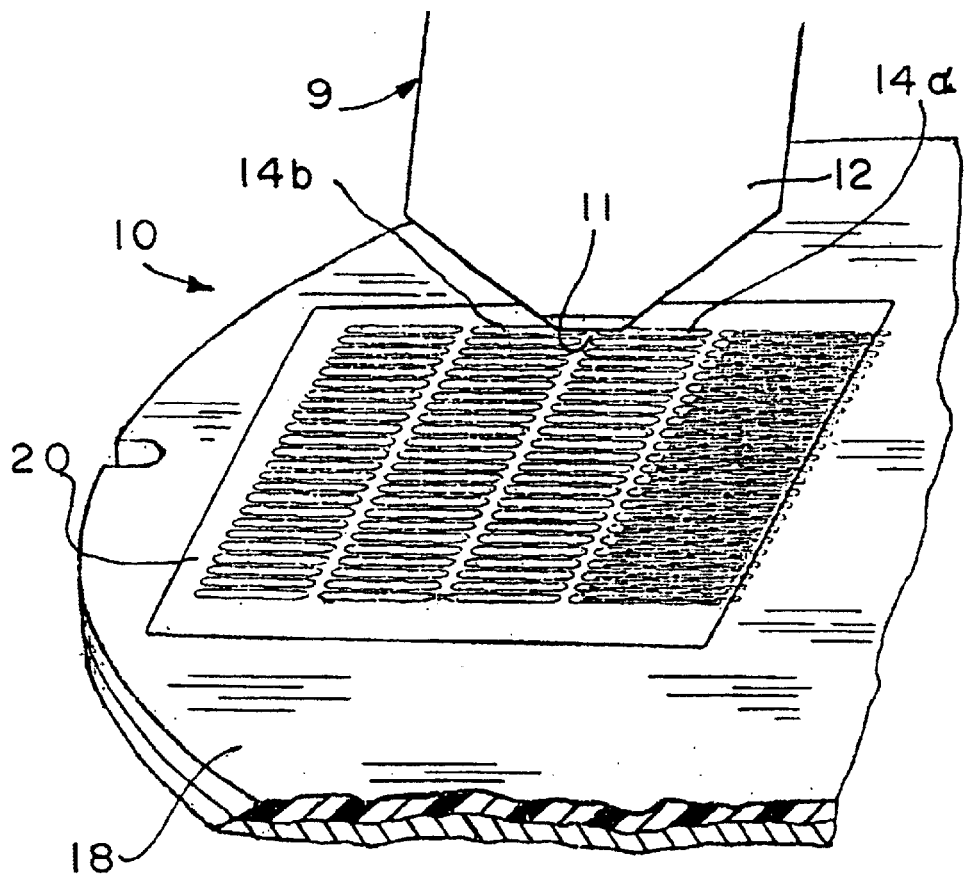
FIG. 1 is a perspective view of a valve in a microfluidic device being opened by an external valve opening device.

FIG. 1 is a perspective view of a valve 11 in a microfluidic device 10, in the process of being opened by an external valve-opening device 9. The external valve-opening device 9 includes an opening blade 12 that can be forced into contact with a cover 20 of the microfluidic device in an area situated between two sample wells, for example, between sample wells 14a, 14b. The cover 20 can include an elastically deformable material, for example. The opening blade 12 can be forced into the cover 20, and can deform a portion of a deformable material forming a substrate 18 of the microfluidic device. The substrate 18 portion to be deformed is located underneath the cover 20 and situated between the two adjacent sample wells 14a, 14b.

When the opening blade 12 is retracted from the microfluidic device 10 after contact with and deformation of the deformable portion of the substrate, the cover 20 can at least partially deform back to its initial shape, thereby creating a channel (not shown) at least partially defined by the cover 20 and the deformed material of the substrate 18. As a result, the two sample wells 14a, 14b can be placed in fluid communication with one another. After a fluid sample has been situated in a radially inwardly arranged sample well 14a, the microfluidic device can be spun to centripetally force fluid sample into the radially outwardly arranged sample well 14b, one or more closing blades can be used to manipulate the deformable material of the substrate 18 to form a barrier wall that interrupts fluid communication between the two sample wells 14a, 14b. The fluid sample in the radially arranged outer well 14b can then be processed without the fluid sample undesirably flowing back into the radially inwardly arranged sample well 14a. Greater details about methods of fluid manipulation including valving that can be employed according to various embodiments include those methods described in U.S. Provisional Patent Applications Nos. 60/398,851, filed Jul. 26, 2002, and 60/399,548, filed Jul. 30, 2002, and in U.S. patent applications ser. Nos. 10/336,274, 10/336,706, and 10/336,330, all three of which were filed on Jan. 3, 2003. All of these provisional patent applications and non-provisional patent applications are incorporated herein in their entireties by reference.

According to various embodiments, a one-directional microball valve as described herein can be used in a microfluidic pathway in place of, or in addition to, the deformable valve described above with reference to FIG. 1. An exemplary microfluidic device including a one-directional microball valve according to various embodiments is shown in FIGS. 2–5.

Figure 2:
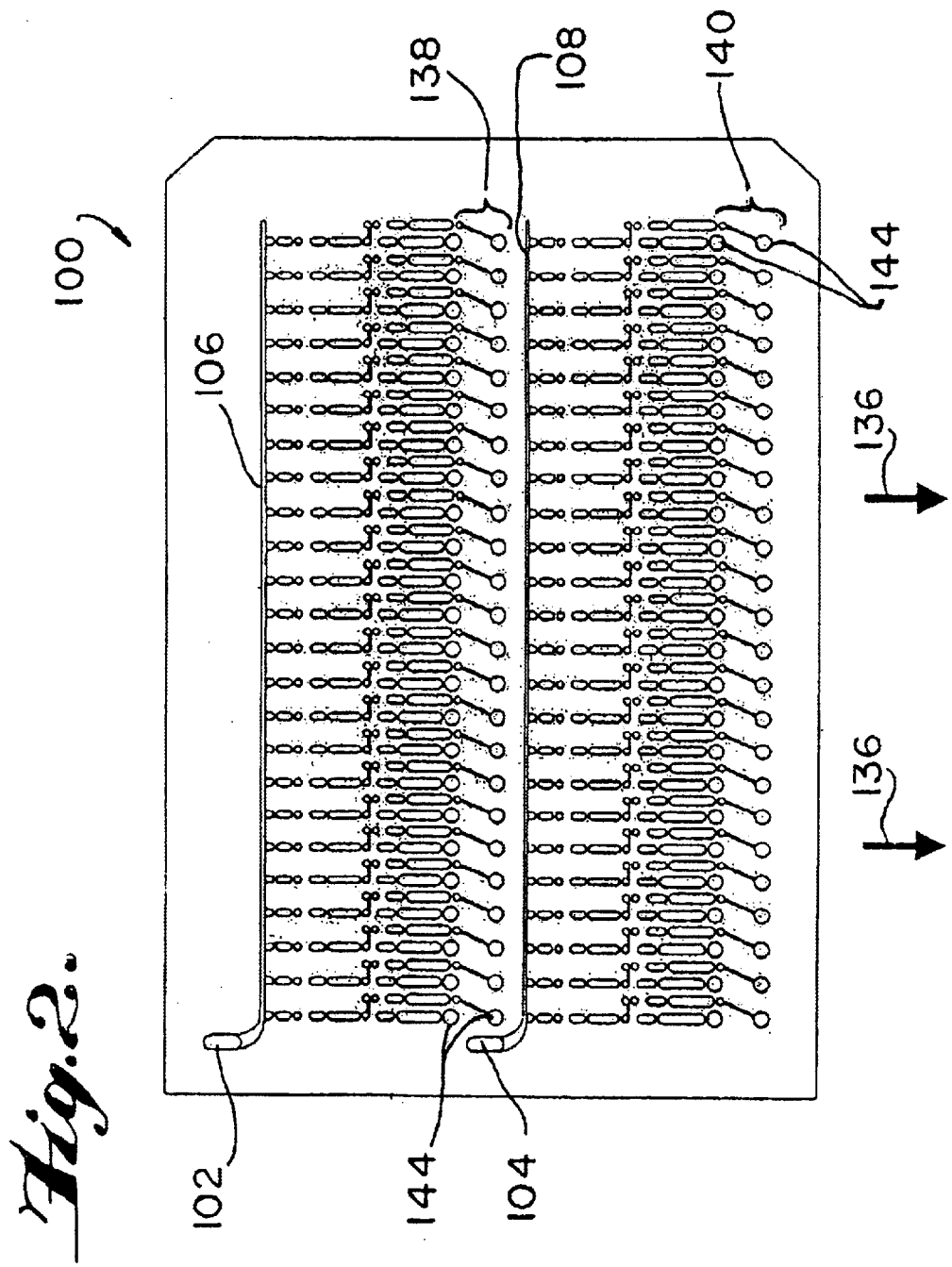
FIG. 2 is a top view of a microfluidic device having a plurality of separate sample processing pathways that can each be provided with at least one one-directional microball valve according to various embodiments.

FIG. 2 is a top view of an exemplary microfluidic device 100 according to various embodiments that can include at least one one-directional microball valve incorporated therein. The microfluidic device 100 can have two input ports 102, 104 for distributing a fluid sample to respective flow distributors 106, 108. Each flow distributor 106, 108 can be in fluid communication with, or be designed to be in valved communication with, a plurality of separate sample processing pathways. The sample processing pathways can each process a respective portion of the fluid sample input into port 102 or 104 as the portion is sequentially moved from the respective flow distributor 106, 108 into the pathways. Each pathway can include a series of wells, chambers, channels, vias, valves, purification columns, and the like, and respective sets of output chambers 138, 140. The direction of sample or fluid flow through the sample processing pathways of the microfluidic device 100 is shown generally by arrows 136 in FIG. 2.

Figure 3:
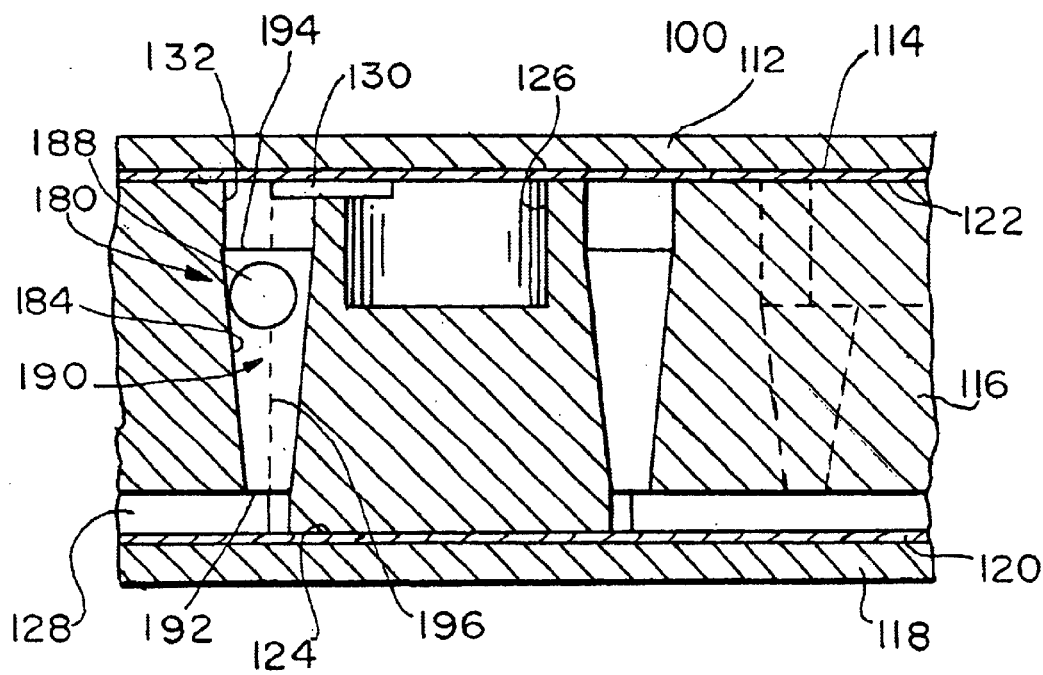
FIG. 3 is a cross-sectional side view of a portion of a sample processing pathway that includes a one-directional microball valve according to various embodiments, and through a portion of an exemplary pathway of the many pathways provided in the microfluidic device shown in FIG. 2.

FIG. 3 is a cross-sectional side view of a portion of a sample processing pathway of the microfluidic device 100 shown in FIG. 2. The cross-section shown in FIG. 3 is taken along an exemplary portion and pathway of the microfluidic device 100 shown in FIG. 2. According to various embodiments, the microfluidic device 100 can include a substrate, for example, in the form of a layer, 116 having a first surface 122. A cover 112 can be attached to the first surface 122 of the substrate 116 by way of an adhesive, by heat bonding, clamps, fasteners, or the like. For example, FIG. 3 illustrates the use of an adhesive layer 114 for attaching the cover 112 to the first surface 122 of the substrate 116. Moreover, according to various embodiments, the microfluidic device 100 can include a second or bottom cover 118 that can be attached to a second or bottom surface 124 of the substrate 116 by way of an adhesive, heat bonding, by clamps, by fasteners, or the like. For example, FIG. 3 illustrates the use of an adhesive layer 120 for attaching the second cover 118 to the second or bottom surface 124 substrate 116. Either or both of the covers 112, 118 can be made from a rigid material, or can be made from a flexible material, such as a polyolefin polymer or rubber, for example. The covers can be elastically deformable and non-brittle.

The substrate 116 can be formed as a single-layer of a non-brittle plastic material, such as polycarbonate, or a single-layer made of TOPAZ, a plastic cyclic olefin copolymer material available from Ticona (Celanese AG), Summit, N.J., USA.

The various wells, chambers, channels, vias, pathways, dividers, valves, and other microfluidic features forming portions of the sample processing pathways, can be formed in the first and second surfaces 122, 124 of the substrate 116, and/or within the body of the substrate 116 of the microfluidic device 100. Methods of manufacturing such features can include using, for example, lithography, stereolithography, machining, etching, masking, depositing, or the like techniques.

FIG. 2 illustrates an exemplary microfluidic device 100 that includes 96 output chambers 144. Other microfluidic devices can be provided with, for example, 192 or 384 output chambers. The exemplary microfluidic device shown in FIG. 2 can include one or more flow distributors 106, 108, in respective fluid communication with 24 parallel branch channels at the introduction of 24 respective separate processing pathways. Each sample processing pathway can include one or more of the following features: a PCR chamber, a PCR purification chamber, a flow restrictor, a flow-splitter, a forward sequencing chamber, a reverse sequencing chamber, a forward sequencing product purification chamber, a reverse sequencing product purification chamber, a purified forward sequencing product output chamber, a purified reverse sequencing product output chamber, and combinations thereof, in addition to one or more microball valves according to any of the various embodiments described herein. Vias, columns, channels, dividers, vertical flow splitters, and the like can be used to facilitate fluid communication between various microfluidic features formed in or on the substrate 116 of the microfluidic device 100. For example, as best shown in FIGS. 3, 4, and 5, channels 128, 130, chamber 132, and through hole 184 can facilitate fluid communication between a flow distributor 106, 108 (not shown in FIGS. 3, 4, and 5) and a microfluidic feature, such as a reaction chamber 126.

Various structural properties and characteristics of the components of the microfluidic device, for example, substrates, covers, cover layers, adhesive layers, input ports, output chambers, pathways, valves, wells, chambers, channels, vias, valves, reagents, flow restrictors, purification columns, and the like, can be, for example, those described in U.S. Provisional Application No. 60/398,851, filed Jul. 26, 2002, in U.S. patent application Ser. No. 10/336,330, filed Jan. 3, 2003, and in U.S. patent application Ser. No. 10/336,274, filed Jan. 3, 2003, all three of which are incorporated herein in their entireties by reference.

Figure 4:
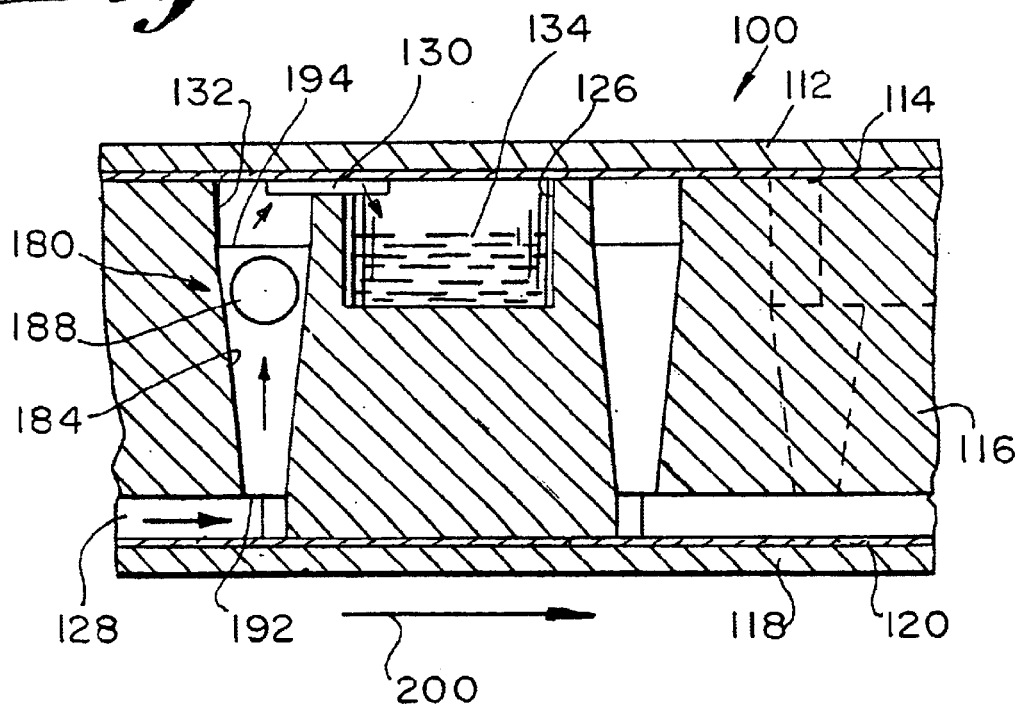
FIG. 4 is a cross-sectional side view of the one-directional microball valve shown in FIG. 3 but in an unseated position and suspended by a fluid sample flowing through the valve.
Figure 5:
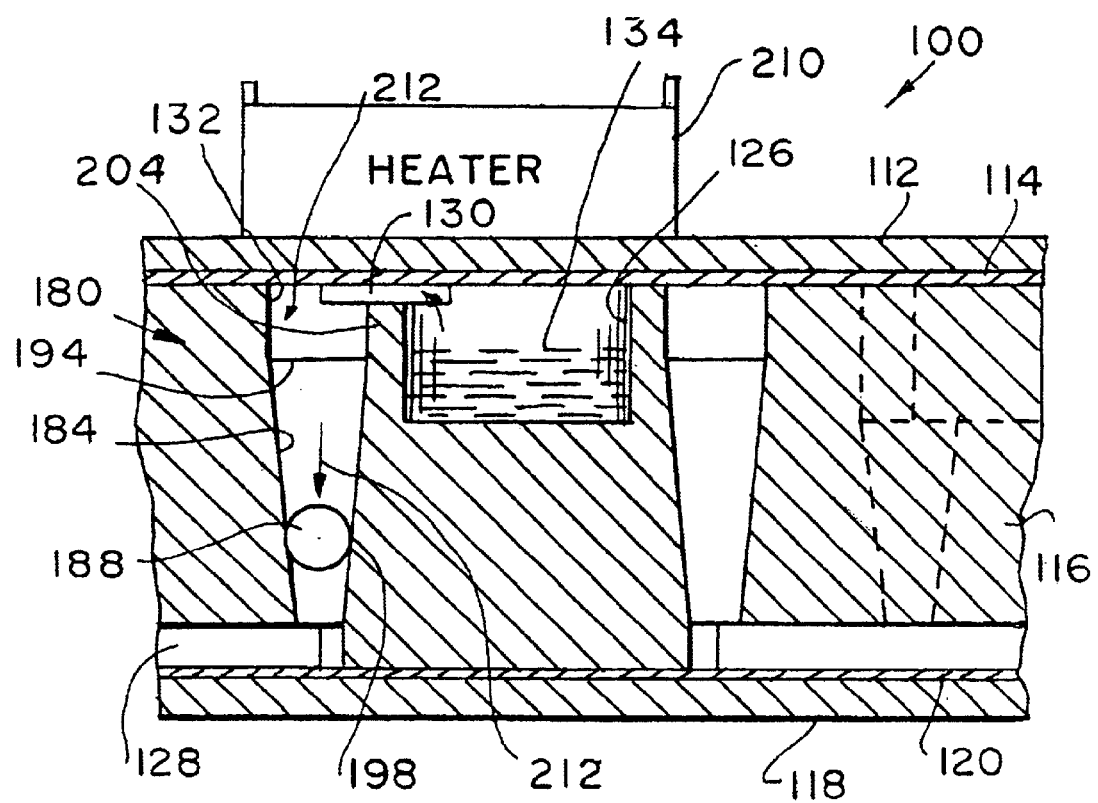
FIG. 5 is a cross-sectional side view of the one-directional microball valve of FIG. 3 in a position seated against the corresponding valve seat, for example, by the force of gravity or by back pressure generated by heating a fluid sample.

FIGS. 3 to 5 illustrate a side view of a one-directional microball valve 180 for controlling fluid flow through the microfluidic device 100 according to various embodiments, and in sequential stages of operation. As shown in FIG. 3, the microball valve 180 can include for a passageway a tapered through hole 184 integrally formed in the substrate 116, although any channel, via, duct, passage, hole, depression, or feature can be used. The tapered through hole 184 can be generally conical such that internal surfaces thereof defines a generally conical passageway 190. The tapered through hole 184 can extend longitudinally within the substrate 116 from an entrance opening 192 to an exit opening 194. A longitudinal axis 196 of the tapered through hole 184 can extend substantially perpendicularly to either or both of a first surface 122 and a second surface 124 of the substrate 116. According to various embodiments, a longitudinal axis 196 of the tapered through hole 184 can be angled with respect to either or both of the first surface 122 and the second surface 124 of the substrate 116.

The entrance opening 192 of the tapered through hole 184 can have a first minimum dimension, for example, a first diameter, and the exit opening 194 of the tapered through hole 184 can have a second minimum dimension, for example, a second diameter, that is larger than the first minimum dimension. The tapered through hole 184 can taper substantially continuously outwardly from the entrance opening 192 in a direction towards the exit opening 194. According to various embodiments, the tapered through hole 184 can include an inner sidewall that is formed of the same material as the substrate 18, or can be in the form of a sleeve that is inserted into, onto, or both into and onto the substrate 116. The tapered through hole can provide a valve seat or valve seat surface for a ball element 188.

According to various embodiments, either or both ends of the tapered through hole 184 of the microball valve 180 can be in fluid communication with various microfluidic features, for example, upstream and/or downstream of the microball valve. For example, as shown in FIGS. 3, 4, and 5, the tapered through hole 184 can be in fluid communication with channels 128, 130, chamber 132, and reaction chamber 126 can be in downstream fluid communication with the tapered through hole 184. Alternatively, other microfluidic features can be in downstream fluid communication with the tapered through hole 184, for example, a sequencing chamber.

According to various embodiments, a ball element 188 can be slideably disposed in the tapered through hole 184. According to various embodiments, the ball element 188 can be a ball and can have a substantially spherical shape. The ball element 188 can be formed of the same material of the substrate 116 and/or formed of the same material making-up the inner side wall of the tapered through hole 184. The ball element 188 can be metallic, plastic, polymeric, elastomeric, or a combination thereof For example, the ball element 188 can be made from a relatively soft plastic, such as polycarbonate.

The ball element 188 can be spherical, ellipsoidal, ovoidal, retanguloid, cylindrical, conical, cubical, or the like, in shape. The valve seat can have a corresponding peripheral or sealing surface that accommodates and mates with the shape of the ball element 188.

The ball element 188 can be dimensioned to slide freely within the tapered through hole 184 and to substantially seal off the entrance opening 192 from the exit opening 194, when seated against a portion of the inner sidewall of tapered through hole 184 which provides a valve seat 198, as shown in FIG. 5. The valve seat 198 can be defined by a portion of the tapered through hole 184, and can have a surface having a substantially circular shape.

Flow-through operation of the one-directional microball valve 100 is illustrated further with reference to FIG. 4. When a fluid sample is forced to travel through the features of the microfluidic device 100, for example, through channel 128, in a direction towards and through the entrance opening 192, a force exerted by the flowing sample can cause the ball element 188 to unseat from the valve seat 198, and thus become, for example, suspended in a middle portion of the tapered through hole. For example, centripetal force can be used to cause the fluid sample to travel through the microfluidic device 100. Centripetal force can be applied, for example, by securing the microfluidic device to a rotating platen and spinning the platen thereby generating centripetal force that can cause the fluid sample to move in a generally radially outward direction. Arrow 200 in FIG. 4 illustrates the direction of unimpeded flow through the microfluidic device 100 in a generally radially outward direction.

As shown in FIG. 4, when the ball element 188 is unseated from the valve seat 198 by the flow of fluid sample into contact with the ball element 188, the fluid sample can flow around and past the unseated ball element 188. The fluid sample can proceed through the tapered through hole 184 in a direction towards and through the exit opening 194. Depending upon the amount and duration of the force applied to the fluid sample, for example, depending upon the speed and duration of rotation of the rotating platen, the fluid sample can be forced to move through one or several additional microfluidic features situated downstream of the exit opening 194. For example, the unlabelled arrows in FIG. 4 illustrate a fluid sample flow path through the exit opening 194, into chamber 132, through a channel 130 and into a reaction chamber 126 for subsequent processing. The reaction chamber 126 can be utilized, for example, as a Polymerase Chain Reaction (PCR) chamber. In FIGS. 4 and 5, the fluid sample is shown at 134 in a position where it has been delivered into reaction chamber 126.

As shown in FIG. 5, after all of the fluid sample moves past the ball valve element 188, and/or, once the force applied by the fluid sample against the ball element 188 is less than a force needed to unseat the ball element 188, the force of gravity can cause the ball element 188 to automatically re-seat against the valve seat 198 if the microfluidic device is situated as shown in FIGS. 3–5. Upon such automatic re-seating, the ball valve element 188 can prevent, interrupt, or limit fluid communication between the entrance opening 192 and the exit opening 194 of the through hole 184.

In addition to the force of gravity, an increase in temperatures, such as, by the application of heat, in the vicinity of the microball valve 180 can cause the ball element 188 to more tightly seat against the valve seat 198. For example, after the fluid sample is forced into the reaction chamber 126, the fluid sample can be thermally cycled to cause PCR. As a result of the thermal cycling, backpressure can be generated by the heated fluid sample in the reaction chamber 126, thereby forcing the ball element 188 to seat more tightly against the valve seat 198. Arrows 212 in FIG. 5 depict the backpressure applied to the ball element 188. A device that can be arranged to contact the microfluidic device or one or more of its covers, for example, cover 112, and to apply heat to an area in the vicinity of the micro ball valve 180, is schematically illustrated in FIG. 5 at 210.

FIG. 5 shows the fluid sample after it has been forced through the one directional microball valve 180 and has been deposited into a microfluidic feature 126, namely a reaction chamber. The reaction chamber 126 can be provided with a ridge 204 separating the reaction chamber 126 from at least the tapered through hole 184. The ridge 204 can operate to prevent the fluid sample from running back, for example, into the tapered through hole 184, once the fluid sample has reached a particular microfluidic feature such as the reaction chamber 126. In addition, the ridge 204 can prevent the ball element 188 from undesirably moving into a subsequent microfluidic feature, such as the reaction chamber 126, thus becoming permanently unseated. The ridge 204 can be a barrier. The ridge 204 can at least partially capture the ball element 188 in the tapered through hole 184.

According to various embodiments, the one-directional microball valve 180 can automatically open and close a fluid communication in a microfluidic device 100 without any external actuation mechanism needed. Moreover, because the need to externally strike or manipulate the microfluidic device 100 can be obviated by the use of the one-directional microball valve 180, better sealing properties can be achieved between the covers 112, 118, and the substrate 116. Proper sealing is desirable, for example, during PCR, when the fluid sample contained in a microfluidic feature of the microfluidic device 100 is thermally cycled.

Figure 6:
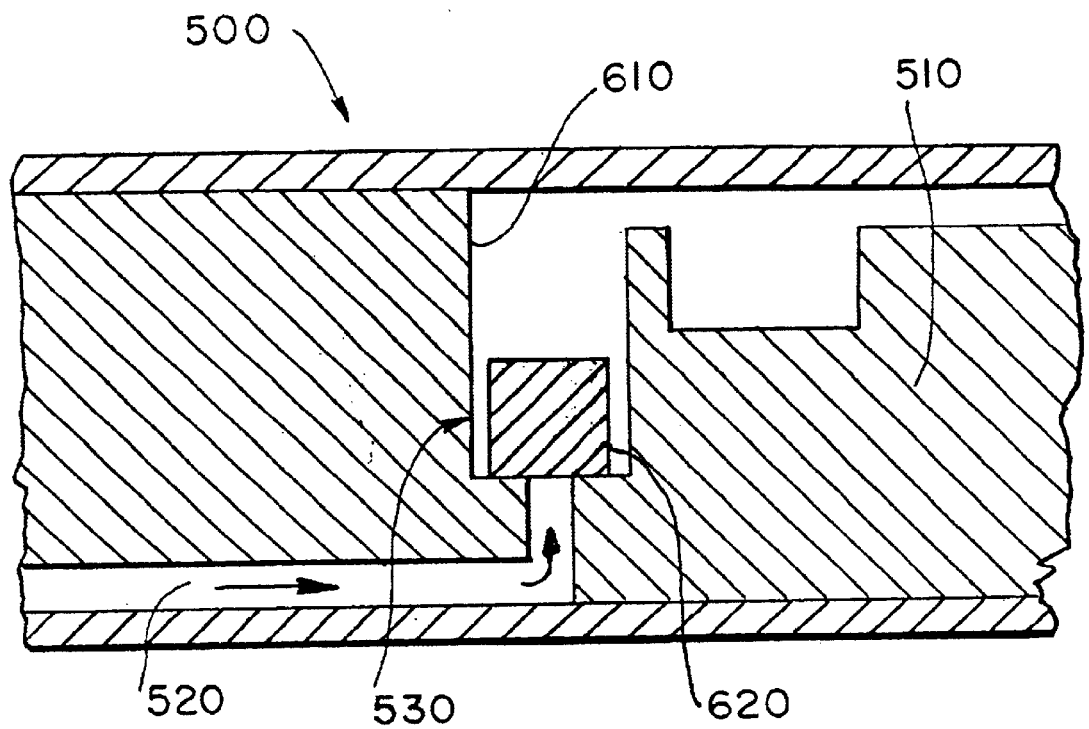
FIG. 6 is a cross-sectional side view of a portion of a sample processing pathway that includes a microball valve according to various embodiments.

As shown in FIG. 6, a microfluidic device 500 is provided with a substrate 510 and a fluid flow pathway 520. The pathway 520 includes a microball valve element 530 having a passageway 610 and a ball element 620. The microball element is cubical in shape, and the passageway 610 is a through-hole with a square cross-section.

According to various embodiments, the tapered through hole depicted can instead be a hollow cylindrical passageway that includes, for example, a shoulder and small entrance opening at one end, and a larger exit opening at an opposite end.

According to various embodiments, the one-directional microball valve can be implemented in an existing microfluidic device. A ball element can be inserted into a pre-existing tapered through hole in a known microfluidic device to form a microfluidic device according to various embodiments. The ball element can be sized to seat against a valve seat portion of the tapered through hole.

According to various embodiments, an existing microfluidic device having a pre-existing non-tapered through hole can be modified by first tapering the through hole. A ball element can then be inserted into the resultant tapered through hole and can be sized to be seated against the valve seat portion of the tapered through hole.

Various components, systems, and methods that can be used in conjunction with the microfluidic devices, apparatus, systems, and methods described herein, include the blades, apparatus, systems, features, and methods described in U.S. Provisional Patent Applications Nos. 60/398,851, filed Jul. 26, 2002, and 60/399,548, filed Jul. 30, 2002, and in U.S. patent applications Ser. Nos. 10/336,274, 10/336,706, and 10/336,330, all three of which were filed on Jan. 3, 2003. All of these provisional patent applications and non-provisional patent applications are incorporated herein in their entireties by reference.

Those skilled in the art can appreciate from the foregoing description that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

What is claimed is:

1. A method of manipulating a fluid in a microfluidic device, the microfluidic device comprising a substrate having a thickness, at least one microfluidic pathway formed in the substrate, the microfluidic pathway including a passageway, the passageway including an entrance opening having a first minimum dimension, and an exit opening having a second minimum dimension that is greater than the first minimum dimension, the passageway further including a valve seat surface situated between the entrance opening and the exit opening, and a ball element in the passageway between the entrance opening and the exit opening; the method comprising:

introducing a fluid into the microfluidic device and in fluid communication with the entrance opening;

manipulating a fluid to unseat the ball valve element and flow from the entrance opening toward the exit opening; and causing the ball element to seat against the valve seat surface to at least partially prevent fluid from flowing in a direction from the exit opening toward the entrance opening;

wherein manipulating a fluid to unseat the ball element comprises spinning the microfluidic device.

2. A method of manipulating a fluid in a microfluidic device, the microfluidic device comprising a substrate having a thickness, at least one microfluidic pathway formed in the substrate, the microfluidic pathway including a passageway, the passageway including an entrance opening having a first minimum dimension, and an exit opening having a second minimum dimension that is greater than the first minimum dimension, the passageway further including a valve seat surface situated between the entrance opening and the exit opening, and a ball element in the passagewuy between the entrance opening and the exit opening; the method comprising:

introducing a fluid into the microfluidic device and in fluid communication with the entrance opening;

manipulating a fluid to unseat the ball valve element and flow from the entrance opening toward the exit opening;

causing the ball element to seat against the valve seat surface to at least partially prevent fluid from flowing in a direction from the exit opening toward the entrance opening; and further comprising heating at least a portion of the pathway downstream of the exit opening.

3. A method of manipulating a fluid in a microfluidic device, the microfluidic device comprisng a substrate having a thickness, at least one microfluidic pathway formed in the substrate, the microfluidic pathway including a passageway, the passageway including an entrance opening having a first minimum dimension, and an exit opening having a second minimum dimension that is greater than the first minimum dimension, the passageway further including, a valve seat surface situated between the entrance opening and the exit opening, a ball element in the passageway between the entrance opening and the exit opening; the method comprising:

introducing a fluid into the microfluidic device and in fluid communication with the entrance opening;

manipulating a fluid to unseat the ball valve element and flow from the entrance opening toward the exit opening;

causing the ball element to seat against the valve seat surface to at least partially prevent fluid from flowing in a direction from the exit opening toward the entrance opening; and further comprising subjecting the fluid in the microfluidic device to a thermal cycling process.

4. A method of manipulating a fluid in a microfluidic device, comprising:

providing a passageway in the microfluidic device that includes a microball valve;
causing the microball valve to open by flowing the fluid through the passageway;
causing the microball valve to close;
wherein the microball valve includes a ball element and a valve seat, and causing the microball to close comprises allowing the force of gravity to move the ball element against the valve seat; and
further comprising heating fluid in the microfluidic device causing back pressure to force the ball element in a direction toward the valve seat.

* * * * *

UNITED STATES PATENT AND TRADEMARK OFFICE
CERTIFICATE OF CORRECTION

PATENT NO. : 6,817,373 B2
DATED : November 16, 2004
INVENTOR(S) : David M. Cox et al.

It is certified that error appears in the above-identified patent and that said Letters Patent is hereby corrected as shown below:

Column 8,
Line 28, replace "passagewuy" with -- passageway --.
Line 44, replace "comprisng" with -- comprising --.

Signed and Sealed this

Twenty-eighth Day of June, 2005

JON W. DUDAS
*Director of the United States Patent and Trademark Office*